United States Patent
Huang et al.

(10) Patent No.: US 10,833,519 B2
(45) Date of Patent: Nov. 10, 2020

(54) WIRELESS CHARGER

(71) Applicant: Hsing-Hui Huang, New Taipei (TW)

(72) Inventors: Hsing-Hui Huang, New Taipei (TW); Ching-Yu Li, Taipei (TW)

(73) Assignee: Hsing-Hui Huang, New Taipei (TW)

( * ) Notice: Subject to any disclaimer, the term of this patent is extended or adjusted under 35 U.S.C. 154(b) by 168 days.

(21) Appl. No.: 16/265,376

(22) Filed: Feb. 1, 2019

(65) Prior Publication Data

US 2019/0245364 A1  Aug. 8, 2019

(30) Foreign Application Priority Data

Feb. 6, 2018  (CN) ...................... 2018 2 0204591 U

(51) Int. Cl.
*H02J 7/00* (2006.01)
*H02J 7/02* (2016.01)
*H04M 1/04* (2006.01)
*H04M 1/02* (2006.01)

(52) U.S. Cl.
CPC ............ *H02J 7/0044* (2013.01); *H02J 7/025* (2013.01); *H04M 1/04* (2013.01); *H04M 1/0202* (2013.01)

(58) Field of Classification Search
CPC ....................................................... H02J 7/00
See application file for complete search history.

(56) References Cited

U.S. PATENT DOCUMENTS

| | | | |
|---|---|---|---|
| 2013/0088193 A1* | 4/2013 | Chen | H02J 50/90 320/108 |
| 2015/0188356 A1* | 7/2015 | Chen | H02J 7/025 320/108 |
| 2016/0105048 A1* | 4/2016 | Lee | F16M 3/00 320/108 |
| 2016/0365744 A1* | 12/2016 | Hyun | H02J 7/025 |
| 2017/0222680 A1* | 8/2017 | Yan | H04B 5/0037 |
| 2017/0327054 A1* | 11/2017 | Yu | G06F 1/16 |

* cited by examiner

*Primary Examiner* — Robert Grant
(74) *Attorney, Agent, or Firm* — Muncy, Geissler, Olds & Lowe, P.C.

(57) ABSTRACT

The present invention provides a wireless charger comprises a housing, a fixing unit and a wireless charging unit. The housing is made of a front cover and a back cover, and the back cover has a fastener and a block. The fixing unit has a fixing gear, an upper gear rack, a bottom gear rack and a fixing structure. The fixing gear is fixed on the block of the back cover; a bottom of the bottom gear rack protrudes a supporting member; the upper gear rack and the bottom gear rack mates with the fixing gear; the fixing gear is rotated by a movement of the upper gear rack and the bottom gear rack; and a spring structure for fixing the fixing structure on the upper gear rack. Further, the wireless charging unit comprises an inductive coil, a controlling circuit board, a through hole and a plug hole.

10 Claims, 16 Drawing Sheets

WIRELESS CHARGER

(a) TECHNICAL FIELD OF THE INVENTION

The present invention relates to a wireless charger used in a car, and more particularly to a wireless charger for a variety of brand mobile phone used in the car.

(b) DESCRIPTION OF THE PRIOR ART

With the popularity of the use of electronic products, people use a variety of portable electronic products in their daily lives; therefore, the demand for the charger is increased. Most of the traditional charger is to provide power by means of a wired manner; hence it is quite inconvenient for the storage and use. Furthermore, the traditional charger cannot be conveniently carried by the user and cannot immediately provide power. When the user is driving and the phone is dead, the user must plug a plug of a wired charger in a charge seat of a car, and place the mobile phone on the charge seat to provide the power of the mobile phone, so people cannot carry the mobile phone any time.

Most people want to reduce the use of cables; therefore, the wireless charging technology is thus created. Further, people do not need to carry cables and sockets when a wireless charger is used for charging the mobile phone. Furthermore, the uses of the radio waves and electromagnetic induction technologies and the induced current into the electromagnetic signal are used for charging the electronic product by the coils of the wireless charger. The electronic product is directly picked up after charging, it is very convenient that the plug does not need.

For the existing wireless charging electronic products, they can be placed on a general table or a plane, but they cannot be fixed on the cars while the cars are running. Therefore, it is difficult for the user to place the wireless charging electronic products, and it is not easy to know the state of charge. The mobile phones cannot be placed on the wireless charger because of the lack of a necessary fixing structure. Therefore, there is a problem that the mobile phone will slip while the user drives the car. Additionally, some wireless chargers have fixing structures, but these fixing structures cannot be used for a variety of mobile phone. Hence, it is very inconvenient for the user to use the wireless charger, because the different brands of the mobile phones need to the different wireless chargers.

SUMMARY OF THE INVENTION

The present disclosure overcomes the presently technical drawback. The main purpose of the present invention is to provide a wireless charger which can be used for different brands of the mobile phones and can be used for charging the mobile phones while the user drives. Furthermore, a fixing structure of the wireless charger of the present invention can prevent mobile phone from slipping while the user drives.

To achieve the above object, the present invention provides a wireless charger comprising a housing, a fixing structure and a wireless charging unit. First, the housing is made of a front cover and a back cover, an accommodating space is formed by the front cover and the back cover, and the back cover has a fastener and a block. Secondly, the fixing unit may have a fixing gear, an upper gear rack, a bottom gear rack and a fixing structure. The fixing gear may be fixed on the block of the back cover, and a bottom of the bottom gear rack protrudes a supporting member. The upper gear rack and the bottom gear rack may mate with the fixing gear, the fixing gear is rotated by a movement of the upper gear rack and the bottom gear rack, and a spring structure is used for fixing the fixing structure to the upper gear rack. Furthermore, the wireless charging unit may comprise an inductive coil, a controlling circuit board, a through hole and a plug hole. The inductive coil may be electrically connected to the controlling circuit board and disposed in the accommodating space. The fastener may be disposed through the through hole of the inductive coil to fix the inductive coil and the controlling circuit board, and the plug hole is connected to a charging device as a power of the wireless charger. Additionally, the fixing structure has two rollers, an axis rod, a recess and a switcher, and the axis rod may be disposed through the two rollers and the two rollers disposed in the recess; wherein the two rollers respectively have two notches, and the switcher is disposed over the two rollers, when the two notches face to the switcher, the switcher is abutted on the two notches by moving the switcher to limit the rotation of the two rollers.

In the wireless charger of the present invention, the fixing structure may have an upper plate structure and a bottom plate structure opposite to the upper plate structure, the switcher may be disposed through an opening on the upper plate structure to protrude the upper plate structure, and the recess may be disposed on the bottom plate structure, so that the two rollers partially protrude the bottom plate structure. Further, a shape of the opening of the upper plate structure layer can be randomly varied based on the user's requirements; a shape of the opening of the upper plate structure may be matched with an appearance of the switcher, such as a round shape, a square shape or a polygonal shape, but the present invention is not limited thereto.

In the wireless charger of the present invention, the spring structure may comprise a spring member and a pivot axis, the upper gear rack may comprise a buffer portion having two first circular holes which are oppositely disposed and disposed through a top of the buffer portion. The fixing structure may comprise an extension portion having two second circular holes which are oppositely disposed and disposed through a bottom of the fixing structure, and the pivot axis may be disposed through the two first circular holes and the two second circular holes, so that the spring member is pivoted between the buffer portion and the extension portion.

In the wireless charger of the present invention, the wireless charging unit may further comprise an encapsulating shell and a connecting cable, the encapsulating shell may be connected to the connecting cable, and the inductive coil, the controlling circuit board, the through hole and the plug hole may be encapsulated in the encapsulating shell, so that the encapsulating shell may be separated from the housing. The encapsulating shell may still be used for charging the mobile phone after the encapsulating shell separated from the housing, and the fixing unit may still be used for fixing the mobile phone. Therefore, the wireless charger may be used for charging one mobile phone and fixing another mobile phone. Furthermore, an appearance of the encapsulating shell may be randomly varied based on the user's requirements, and the appearance of the encapsulating shell may be a circular shape, an oval shape, a star shape, a triangular shape, a quadrangular shape or a polygonal shape, but the present invention is not limited thereto.

In the wireless charger of the present invention, the appearances of each of the two rollers may be a cylinder, a gear shape, a star shape, a column, a fan shape or a cylinder shape with a notch.

In the wireless charger of the present invention, the wireless charger may further comprise a fixture having a first threaded hole, a first screw and a holder; wherein the first screw may be engaged with the first threaded hole and a first thread of the back cover, and the fixture may have an orbicular portion connected to the first threaded hole, so that the fixture is conjugated to the back cover.

In the wireless charger of the present invention, the wireless charger may further comprise a connecting seat having a second threaded hole, a second screw and a fastening member; wherein the second screw may be engaged with the second threaded hole and a second thread of the back cover, and the fastening member is connected to the second threaded hole. Additionally, the wireless charger may be fixed at the air outlet of the car air conditioner by the fastening member.

To achieve the above another object, the present invention provides a wireless charger comprising a housing, a fixing structure, a wireless charging unit and an elastomeric member. First, the housing made of a front cover and a back cover, an accommodating space is formed by the front cover and the back cover, and the back cover has a fastener and a block. Secondly, the fixing unit may have a fixing gear, an upper gear rack, a bottom gear rack and a fixing structure. The fixing gear may be fixed on the block of the back cover, and a bottom of the bottom gear rack protrudes a supporting member. The upper gear rack and the bottom gear rack may mate with the fixing gear, the fixing gear is rotated by a movement of the upper gear rack and the bottom gear rack, and a spring structure is used for fixing the fixing structure to the upper gear rack. Furthermore, the wireless charging unit may comprise an inductive coil, a controlling circuit board, a through hole and a plug hole. The inductive coil may be electrically connected to the controlling circuit board and disposed in the accommodating space. The fastener may be disposed through the through hole of the inductive coil to fix the inductive coil and the controlling circuit board, and the plug hole is connected to a charging device as a power of the wireless charger. Additionally, the elastomeric member may be disposed on a surface of the fixing structure.

In the wireless charger of the present invention, the spring structure comprises a spring member and a pivot axis, and the upper gear rack comprises a buffer portion having two first circular holes which are oppositely disposed and disposed through a top of the buffer portion. Further, the fixing structure comprises an extension portion having two second circular holes which are oppositely disposed and disposed through a bottom of the fixing structure, and the pivot is axis disposed through the two first circular holes and the two second circular holes, so that the spring member is pivoted between the buffer portion and the extension portion.

In the wireless charger of the present invention, the elastomeric member is an elastomeric polymer, and materials of the elastomeric member may or an appearance of the housing may be randomly varied based on the user's requirements. The elastomeric polymer may comprise a synthetic rubber and a natural rubber, but the present invention is not limited thereto. Further, the synthetic rubber may be brominated butyl rubber, 3-polybutadiene rubber, chlorinated butyl rubber, polychloroprene, chlorosulfonated polyethylene rubber, epichlorohydrin, ethylene propylene rubber, fluorinated hydrocarbon rubber, fluorinated silicone rubber, hydrogenated nitrile rubber, polyisoprene rubber, butyl isobutene isoprene rubber, methyl vinyl silicon rubber, acrylonitrile butadiene rubber, styrene butadiene rubber, or carboxyl monomer acrylonitrile butadiene rubber. Furthermore, the natural rubber may be an elastomeric polymer, a main component is polyisoprene respected by a chemical formula of [C5H8-]n, and the rest of the components are proteins, fatty acid, glucide and other components other than rubber.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
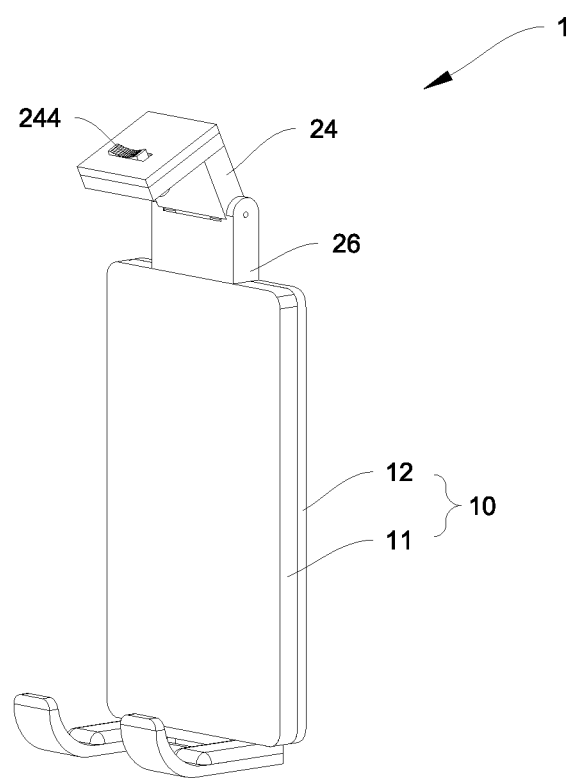
FIG. 1 is a stereoscopical schematic view of a wireless charger according to Example 1 of the present invention.
Figure 2:
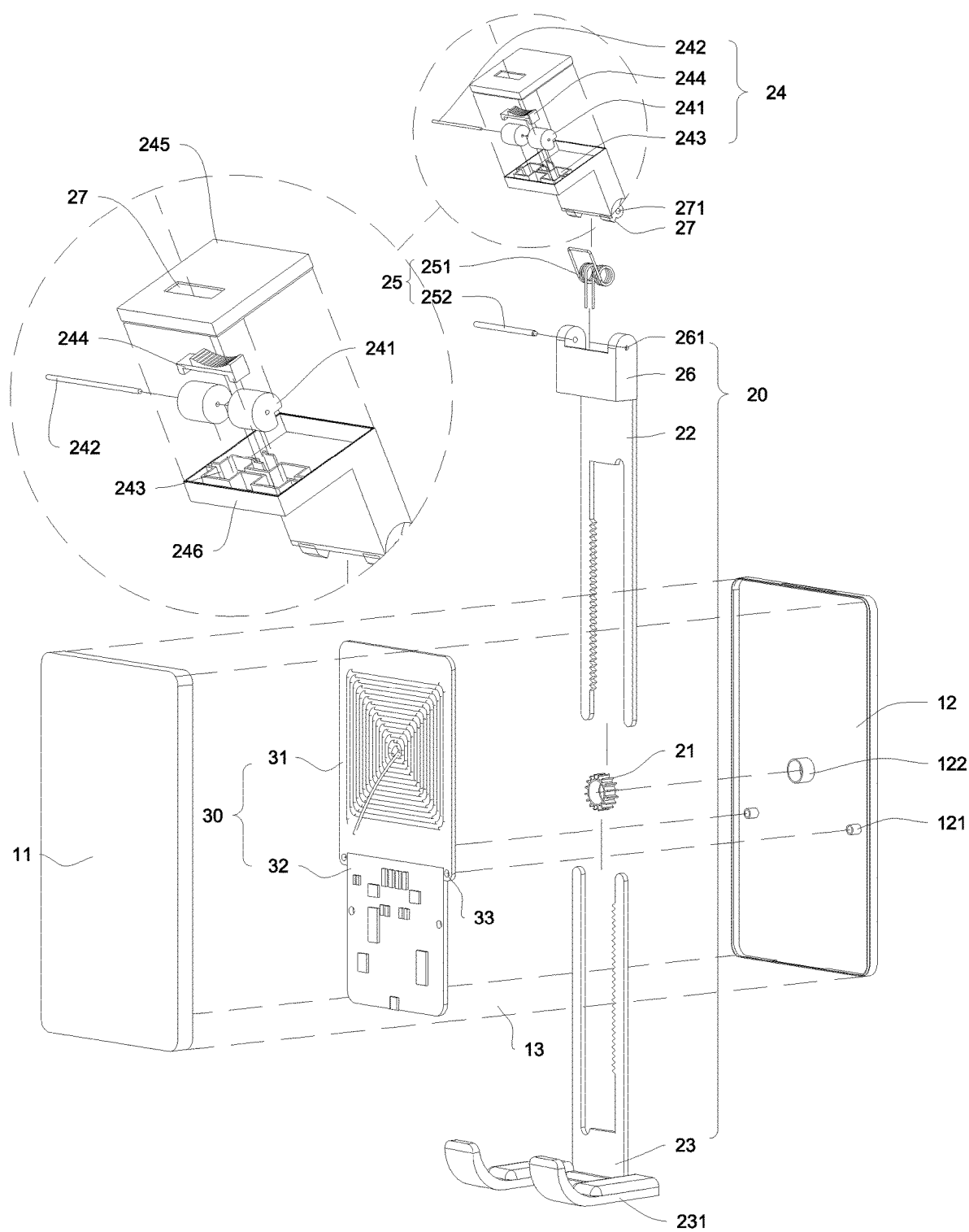
FIG. 2 is an exploded view of right side of the wireless charger according to Example 1 of the present invention.
Figure 3:
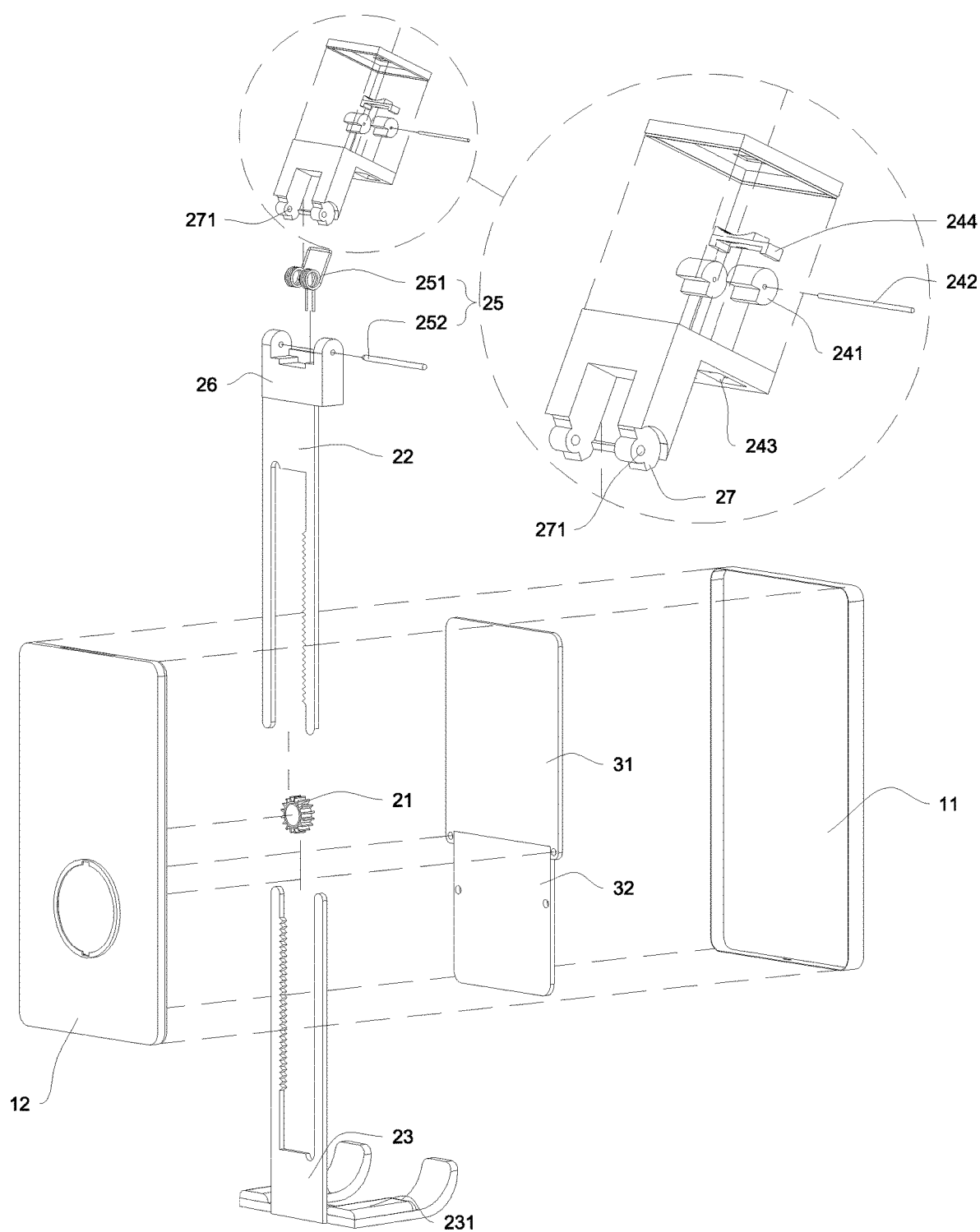
FIG. 3 is an exploded view of left side of the wireless charger according to Example 1 of the present invention.
Figure 4B:
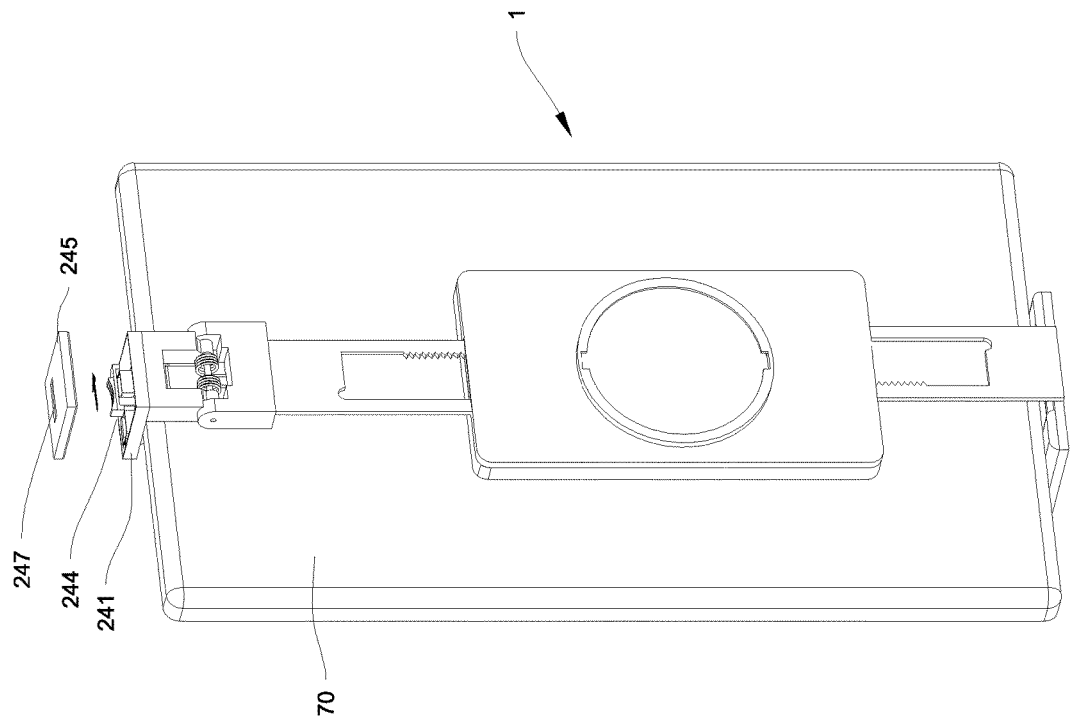
FIG. 4a and FIG. 4b are schematic views of a movement of a switcher of the wireless charger according to Example 1 of the present invention.
Figure 4A:
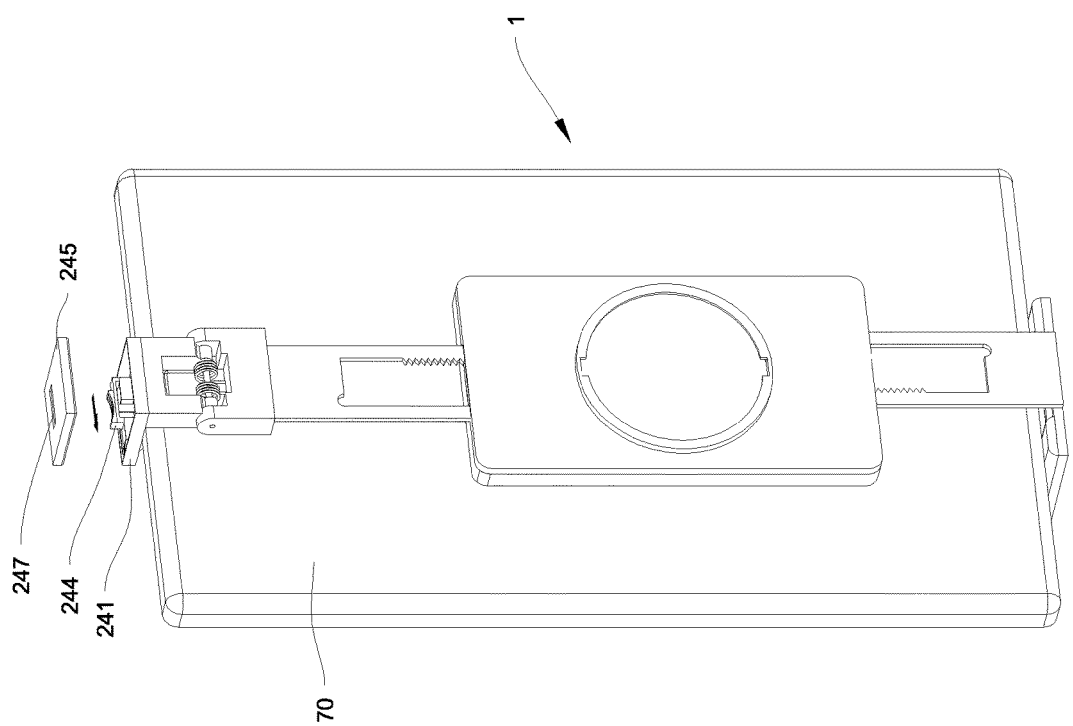

Please refer to FIG. 1 to FIG. 3, FIG. 1 is a stereoscopical schematic view of a wireless charger according to Example 2 of the present invention; FIG. 2 is an exploded view of right side of the wireless charger according to Example 1 of the present invention; and FIG. 3 is an exploded view of left side of the wireless charger according to Example 1 of the present invention.

As shown in FIG. 1 to FIG. 3, Example 1 of the present invention provides a wireless charger 1 comprising a housing 10, a fixing unit 20 and a wireless charging unit 30. First, the housing 10 is made of a front cover 11 and a back cover 12, an accommodating space 13 is formed by the front cover 11 and the back cover 12, and the back cover 12 has a fastener 121 and a block 122. Secondly, the fixing unit 20 may have a fixing gear 21, an upper gear rack 22, a bottom gear rack 23 and a fixing structure 24. The fixing gear 21 may be fixed on the block 122 of the back cover 12, and a bottom of the bottom gear rack 23 protrudes a supporting member 231. The upper gear rack 22 and the bottom gear rack 23 may mate with the fixing gear 21, the fixing gear 21 is rotated by a movement of the upper gear rack 22 and the bottom gear rack 23, and a spring structure 25 is used for fixing the fixing structure 24 to the upper gear rack 22. Furthermore, the wireless charging unit 30 may comprise an inductive coil 31, a controlling circuit board 32, a through hole 33 and a plug hole 34. The inductive coil 31 may be electrically connected to the controlling circuit board 32 and disposed in the accommodating space 13. The fastener 121 may be disposed through the through hole 33 of the inductive coil 31 to fix the inductive coil 31 and the controlling circuit board 32, and the plug hole 34 is connected to a charging device (not shown in figures) as a power of the wireless charger 1. Additionally, the fixing structure 24 has two rollers 241, an axis rod 242, a recess 243 and a switcher 244, and the axis rod 242 may be disposed through the two rollers 241 and the two rollers 241 disposed in the recess 243; wherein the two rollers 241 respectively have two notches 2411, and the switcher 244 is disposed over the two rollers 241, when the two notches 2411 face to the switcher 244, the switcher 244 is abutted on the two notches 2422 by moving the switcher 244 to limit the rotation of the two rollers 241.

As shown in FIG. 2 to FIG. 3, the fixing structure 24 may have an upper plate structure 245 and a bottom plate structure 246 opposite to the upper plate structure 246, the switcher 244 may be disposed through an opening 247 on the upper plate structure 245 to protrude the upper plate structure 245, and the recess 243 may be disposed on the bottom plate structure 246, so that the two rollers 241 partially protrude the bottom plate structure 246. Additionally, the spring structure 25 may comprise a spring member 251 and a pivot axis 252, the upper gear rack 22 may comprise a buffer portion 26 having two first circular holes 261 which are oppositely disposed and disposed through a top of the buffer portion 26. The fixing structure 24 may comprise an extension portion having two second circular holes which are oppositely disposed and disposed through a bottom of the fixing structure 24, and the pivot axis 252 may be disposed through the two first circular holes 261 and the two second circular holes 271, so that the spring member 251 is pivoted between the buffer portion 26 and the extension portion 27.

Figures 5A, 5B:
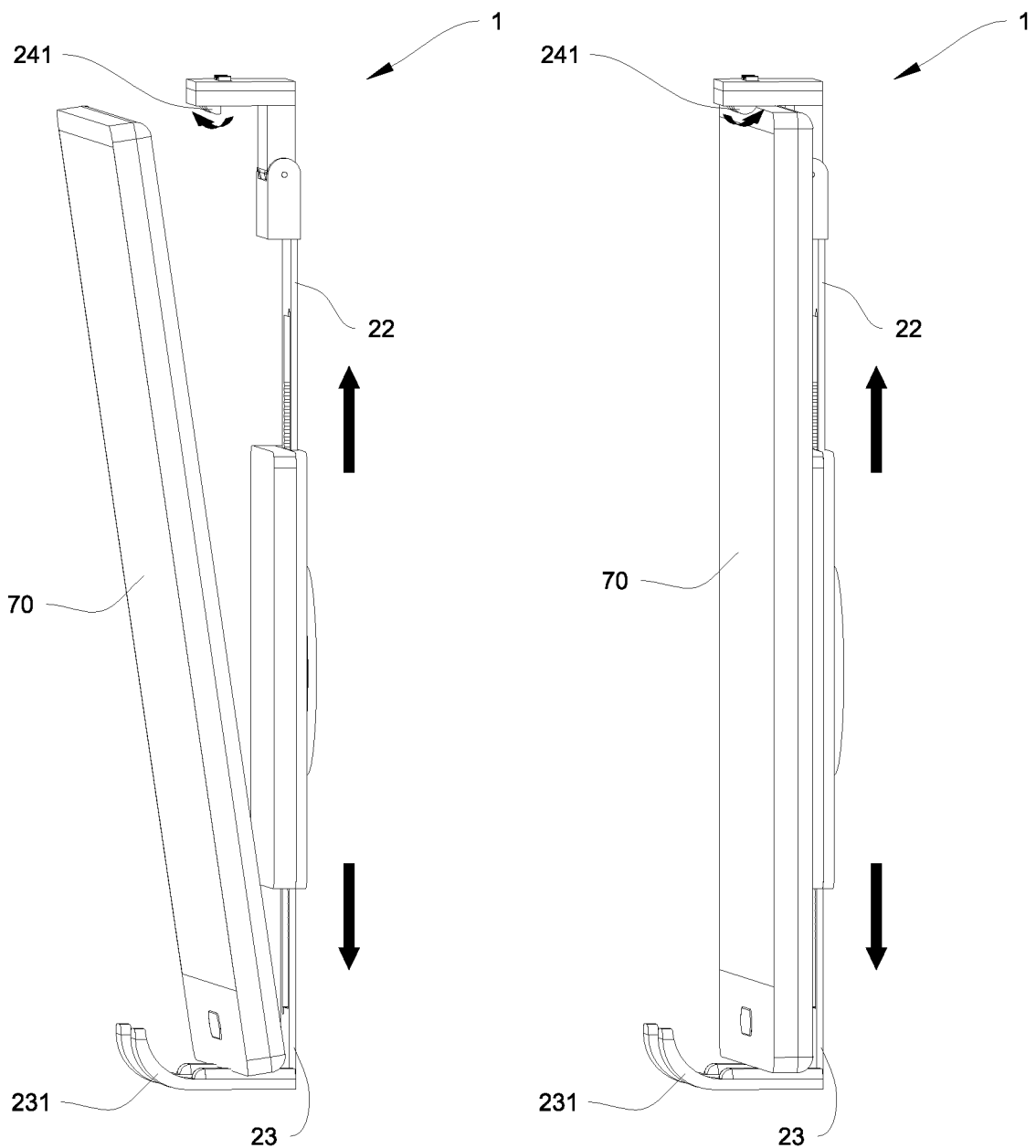
FIG. 5a and FIG. 5b are schematic views of an application of the wireless charger according to Example 1 of the present invention.
Figure 6:
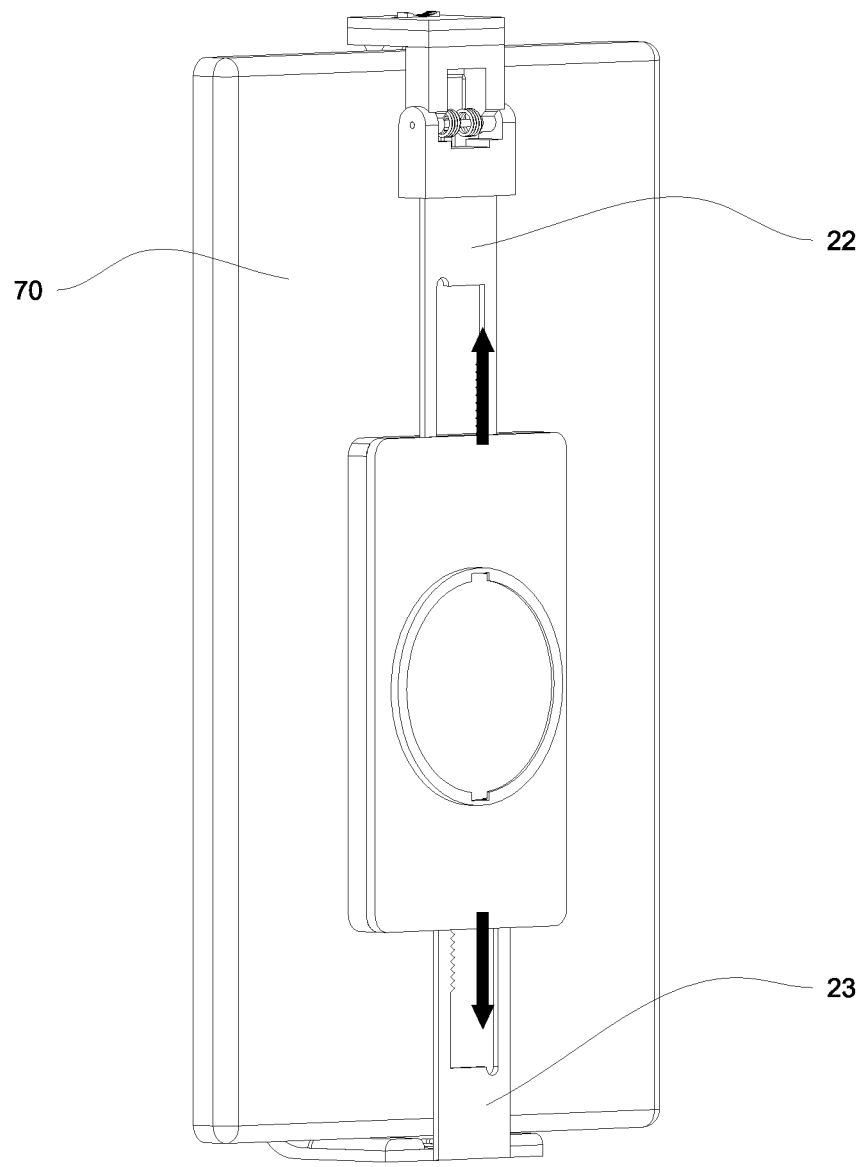
FIG. 6 is a left side view of a mobile phone assembled with the wireless charger according to Example 1 of the present invention.

Please refer to FIG. 4a to FIG. 6, FIG. 4a and FIG. 4b are schematic views of a movement of a switcher of the wireless charger according to Example 1 of the present invention; FIG. 5a and FIG. 5b are schematic views of an application of the wireless charger according to Example 1 of the present invention; FIG. 6 is a left side view of a mobile phone assembled with the wireless charger according to Example 1 of the present invention.

As shown in FIG. 4a to FIG. 5b, when the wireless charger 1 of the present invention is used by the user, a mobile phone 70 is firstly disposed on the supporting member 231 of the bottom gear rack 23. When the mobile phone 70 is not abutted the two roller 241, the two notches 2411 of the two roller 241 face to the fixing structure 24. Further, the mobile phone 70 is gently pushed into the wireless charger 1, and the mobile phone 70 is abutted on the two rollers 241 to drive the rotation of the two rollers 241, so that the two notches 2411 of the two roller 241 face to the swisher 244, as shown by the arrow in FIG. 5b. Furthermore, the swisher 244 is abutted on the two notches 2411 by moving the swisher 244 to a closed position to limit the rotation of the two rollers 2410, as shown in by the arrow in FIG. 4a. Finally, the mobile phone 70 is fixed into the wireless charger 1 to perform a charging step. When the charging step is completed, the switcher 244 is moved to an opening position by the user, as shown by the arrow in FIG. 4b, the mobile phone 70 is thus removed from the wireless charger 1 by the user. The two rollers 241 is rotated because of removing the mobile phone 70, as shown by the arrow in FIG. 5a, so that the two notches 2411 face to the fixing structure 24. Additionally, the switcher 244 may be designed as a press type, and the switcher 244 is moved to a closed position when the switcher 244 is pressed, so that switcher 244 is abutted on the two notches 244 to limit the rotation of the two rollers 241. After the mobile phone 70 is charged, the switcher 244 is moved to an open position by pressing the switcher 244, so that the switcher 244 is separated from the two notches 244.

As shown in FIG. 5a to FIG. 6, when the mobile phone 70 is placed in the wireless charger 1, a position of the upper gear rack 22 and the bottom gear rack 23 may be adjusted because of the different size of the mobile phone 70, as shown by the vertical arrows in FIG. 5a to FIG. 6, so that the mobile phone 70 may be placed in the wireless charger 1 to prevent the mobile phone 70 from slipping or a question which the mobile phone 70 cannot be put into the wireless charger 1.

Figure 7:
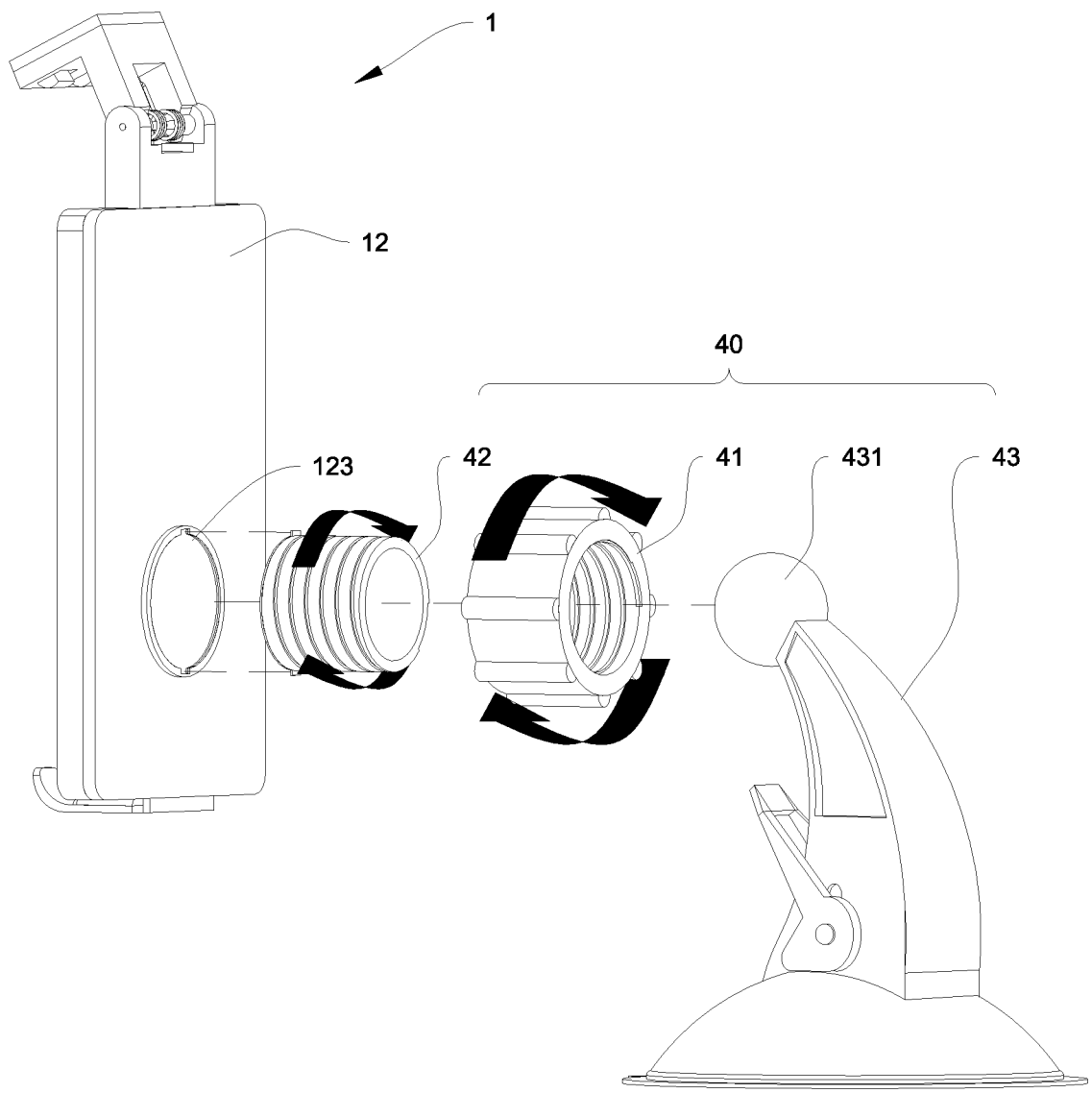
FIG. 7 is an exploded view of a fixture assembled with the wireless charger according to Example 1 of the present invention.
Figure 8:
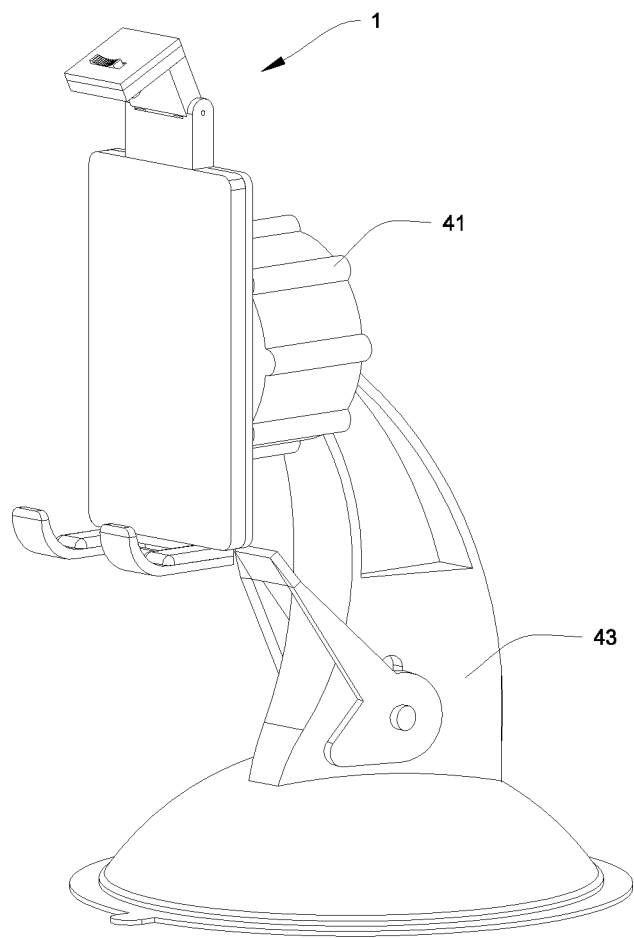
FIG. 8 is a stereoscopical schematic view of the fixture assembled with the wireless charger according to Example 1 of the present invention.

Please refer to FIG. 7 to FIG. 8, FIG. 7 is an exploded view of a fixture assembled with the wireless charger according to Example 1 of the present invention; and FIG. 8 is a stereoscopical schematic view of the fixture assembled with the wireless charger according to Example 1 of the present invention.

As shown in FIG. 7 to FIG. 8, the wireless charger 1 may be combined with a fixture 40 having a first threaded hole 41, a first screw 42 and a holder 43; wherein the first screw 42 is engaged with the first threaded hole 41 and a first thread 123 of the back cover 12, and the fixture 43 has an orbicular portion 431 connected to the first threaded hole 41, so that the fixture 40 is conjugated to the back cover 12. The wireless charger 1 is fixed to the fixture 40 or separated from the fixture 40 based on the user's requirements.

Figure 9:
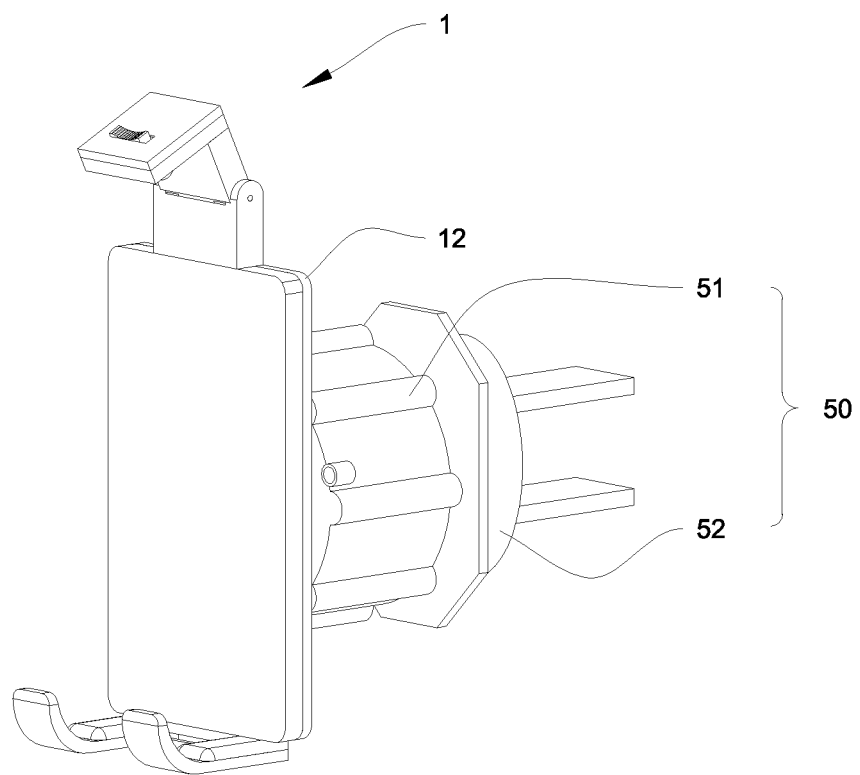
FIG. 9 is a stereoscopical schematic view of a connecting seat assembled with the wireless charger according to Example 1 of the present invention.

Please refer to FIG. 9, FIG. 9 is a stereoscopical schematic view of a connecting seat assembled with the wireless charger according to Example 1 of the present invention. As shown in FIG. 9, the wireless charger 1 further comprise a connecting seat 50 having a second threaded hole 51, a second screw (not shown in figure) and a fastening member 52; wherein the second screw is engaged with the second threaded hole 51 and a second thread (not shown in figure) of the back cover 12, and the fastening member 52 is connected to the second threaded hole 51.

Figure 10:
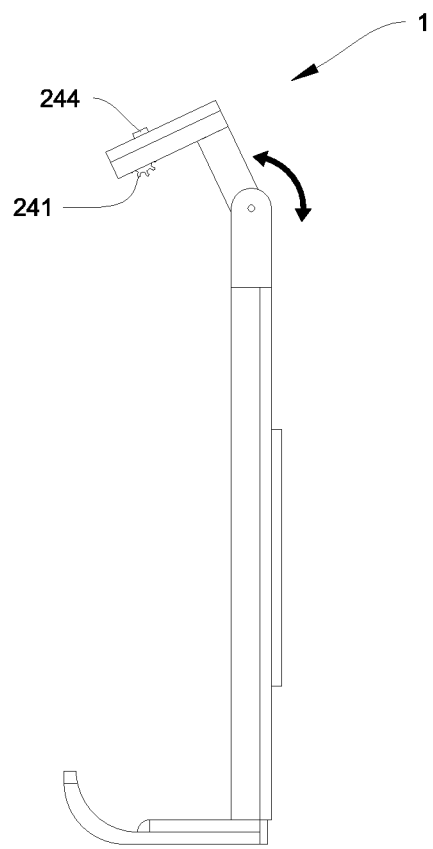
FIG. 10 is a stereoscopical schematic view of each of two rollers with a gear shape according to Example 2 of the present invention.

Please refer to FIG. 10, FIG. 10 is a stereoscopical schematic view of each of two rollers with a gear shape according to Example 2 of the present invention. As shown in FIG. 10, the wireless charger of Example 2 of the present invention is substantially the same as the above Example 1, but the details mentioned above applies to the wireless charger with the only difference that each shape of the two rollers of Example 2 is a gear shape.

Figure 11:
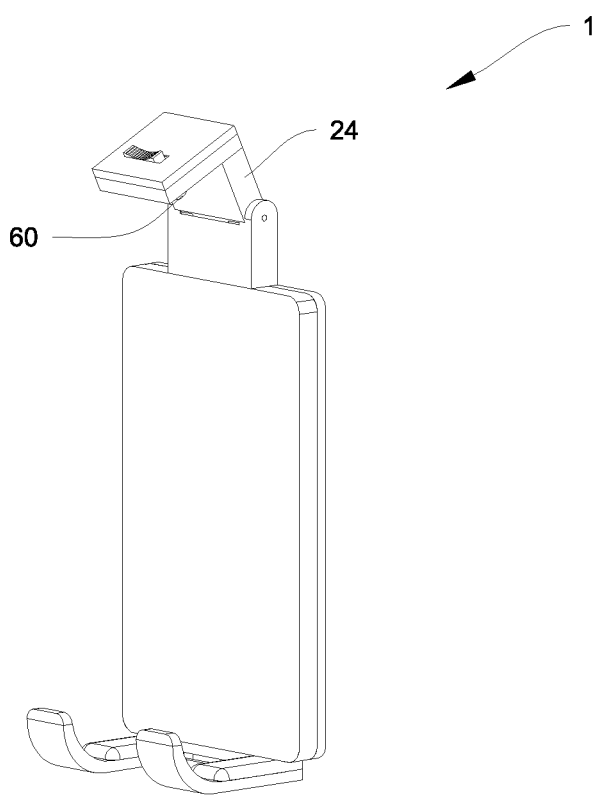
FIG. 11 is a stereoscopical schematic view of the wireless charger according to Example 3 of the present invention.
Figure 12:
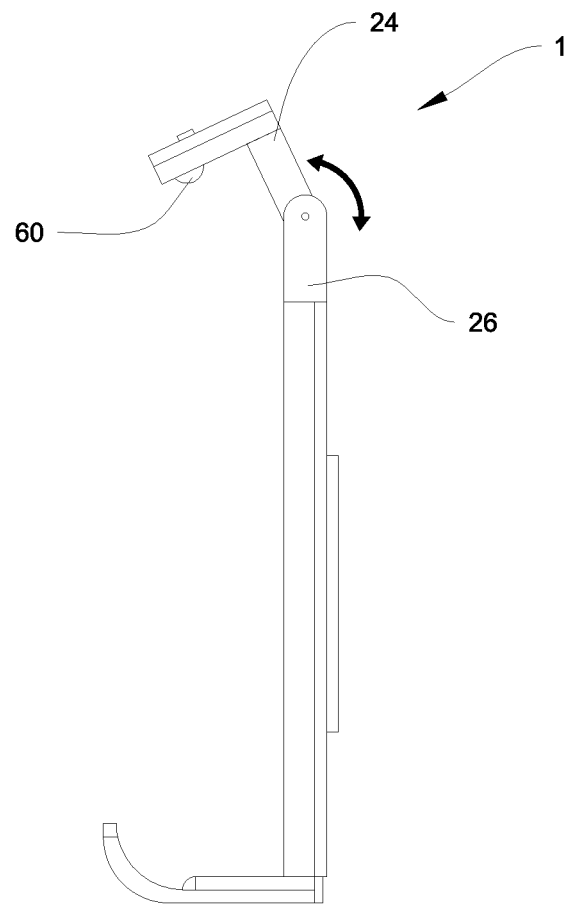
FIG. 12 is a side view of the wireless charger according to Example 3 of the present invention.

Please refer to FIG. 11 to FIG. 12, FIG. 11 is a stereoscopical schematic view of the wireless charger according to Example 3 of the present invention; and FIG. 12 is a side view of the wireless charger according to Example 3 of the present invention. The wireless charger of Example 3 of the present invention is substantially the same as the above Example 1, but the details mentioned above applies to the wireless charger with the some difference as follows. As shown in FIG. 2, the fixing structure 24 of the fixing unit 20 of Example 1 has the two rollers 241, the axis rod 242, the recess 243 and the switcher 244. However, as shown in FIG. 11 to FIG. 12, the fixing unit 20 of Example 3 has an elastomeric member 60 disposed on a surface of the fixing structure 24. As shown FIG. 12, the fixing structure 24 is fixed to the buffer portion 26 by the spring structure (not shown in figure). The fixing structure 24 may be moved back and forth by the spring structure, as shown by the arrow in FIG. 12, so that the mobile phone can be conveniently placed in the wireless charger 1 by moving back and forth the fixing structure 24.

Figure 13:
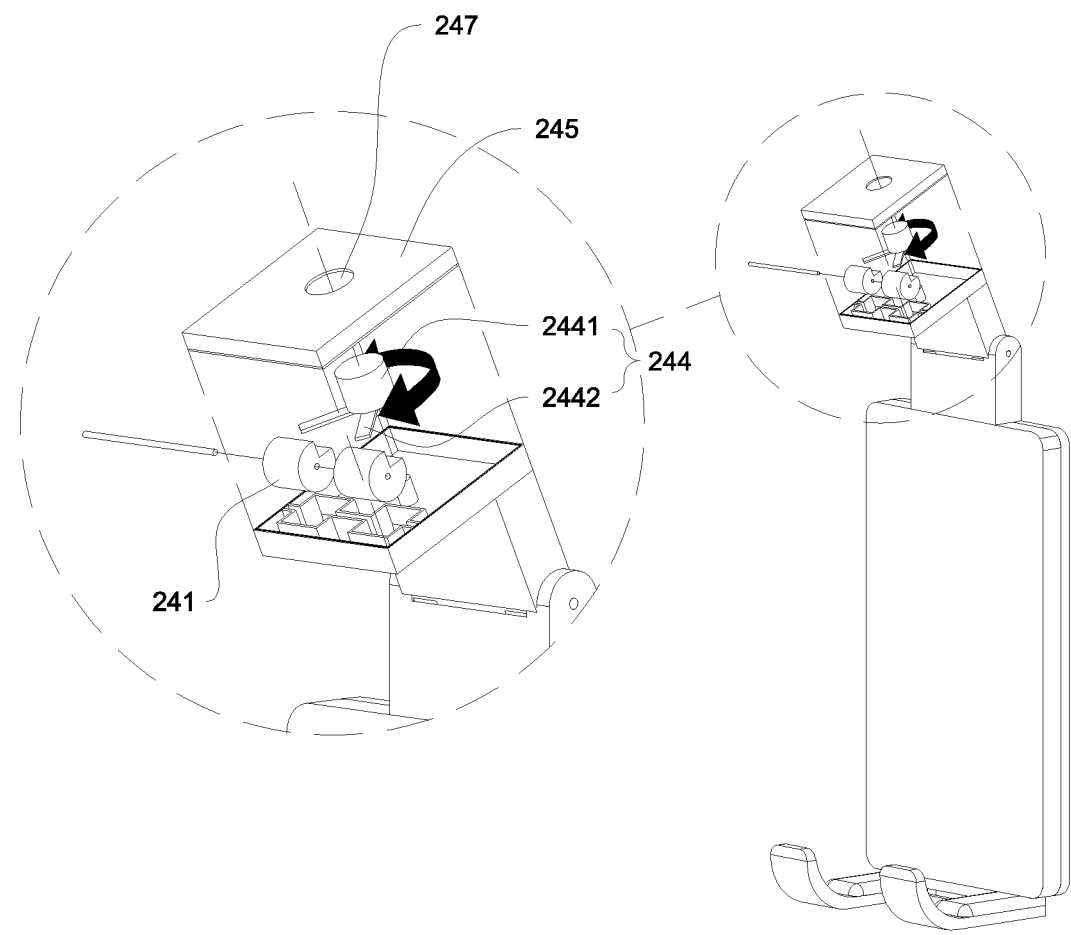
FIG. 13 is an enlarged view of a portion of the fixing structure according to Example 4 of the present invention.

Please refer to FIG. 13, FIG. 13 is an enlarged view of a portion of the fixing structure according to Example 4 of the present invention. As shown in FIG. 13, the wireless charger of Example 4 of the present invention is substantially the same as the above Example 1, but the details mentioned above applies to the wireless charger with the some difference as follows. The switcher 244 of Example 4 is a fan shape, and the opening 247 of the upper plate structure 245 is a round shape; wherein the size and shape of the round shape conform to the size and shape of the switcher 244. When the mobile phone (not shown in figure) is charged by the user, the mobile phone is gently pushed into the wireless charger 1, and the mobile phone drives the rotation of the two rollers 241 because of the mobile phone to be abutted on the two rollers 241, so that the two notches 2411 of the two rollers 241 face to the swisher 244. A part of blades of the switcher 244 are abutted on the two notches 244, and a part of blades is rotated to a position between the two rollers, so that the mobile phone is fixed into the wireless charger to perform a charging step. After the charging step of the mobile phone is completed, the switcher 244 is moved by the user, so that the blades 2442 are separated from the two notches 2411 and the two rollers 241, and the mobile phone is removed from the wireless charger 1 by the user to achieve the charging step. Further, a rotation direction of a rotating shaft 2441 is shown in by the arrow in FIG. 13.

Figure 14:
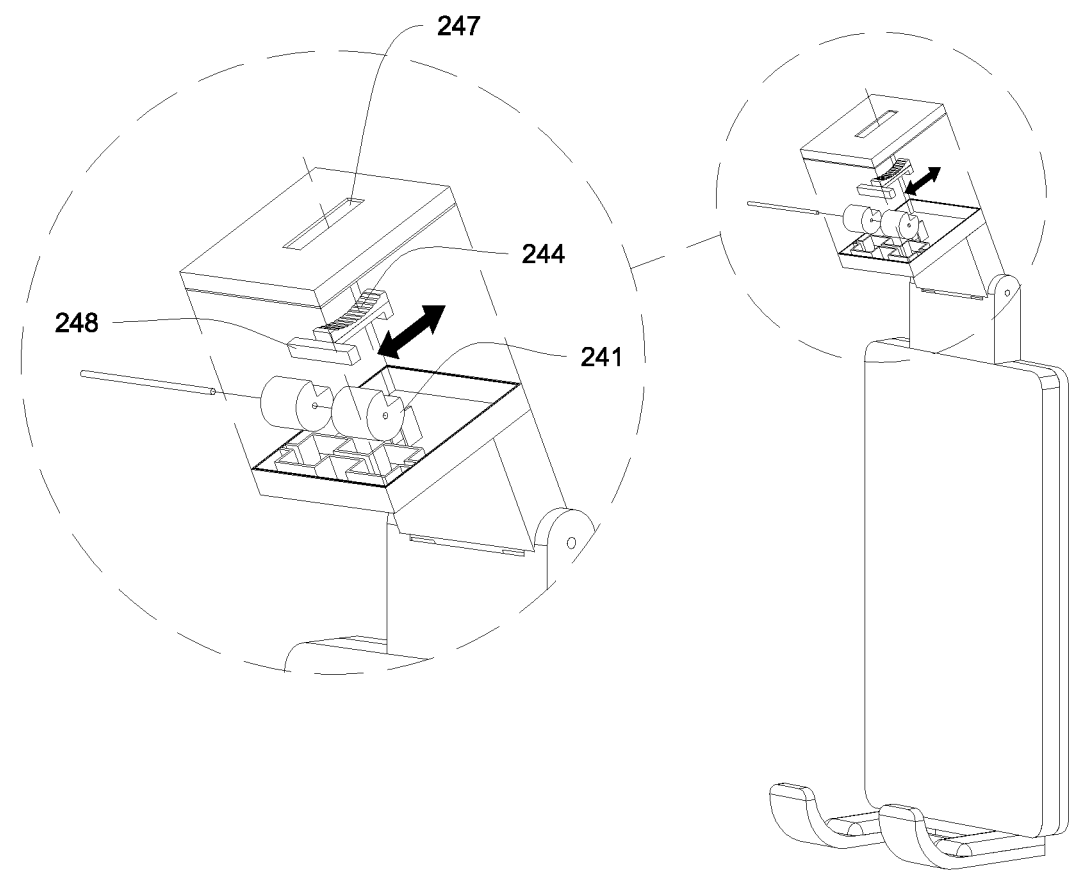
FIG. 14 is an enlarged view of a portion of the fixing structure according to Example 5 of the present invention.

Please refer to FIG. 14, FIG. 14 is an enlarged view of a portion of the fixing structure according to Example 5 of the present invention. As shown in FIG. 14, the wireless charger 1 of Example 5 of the present invention is substantially the same as the above Example 1, but the details mentioned above applies to the wireless charger with the only difference that the switcher 244 of Example 5 further comprises an abutting member 248, and the switcher 244 is perpendicular disposed relative to the two rollers 241. When the wireless charger of the present invention is used by the user, the mobile phone (not shown in figure) is first placed into the wireless charger, and the two rollers is rotated because of the mobile phone abutting the two rollers, so that the two notches 2411 of the two rollers 241 face to the switcher 244. The abutting member 248 is abutted on the notches of the two rollers by moving the switcher 244 to a closed position, so that the mobile phone 70 is fixed into the wireless charger to perform a charging step. After the charging step of the mobile phone 70 is completed, the switcher 244 is moved to an opening position by the user; the mobile phone 70 is thus removed from the wireless charger 1 to achieve the charging step. Further, the switcher 244 may be moved back and forth, as shown by the arrow in FIG. 14, the abutting member 248 is abutted on or separated from the two notches of the two rollers. When the abutting member 248 is abutted on the two notches of the two rollers, the mobile phone is fixed to prevent it from slipping off.

Figure 15:
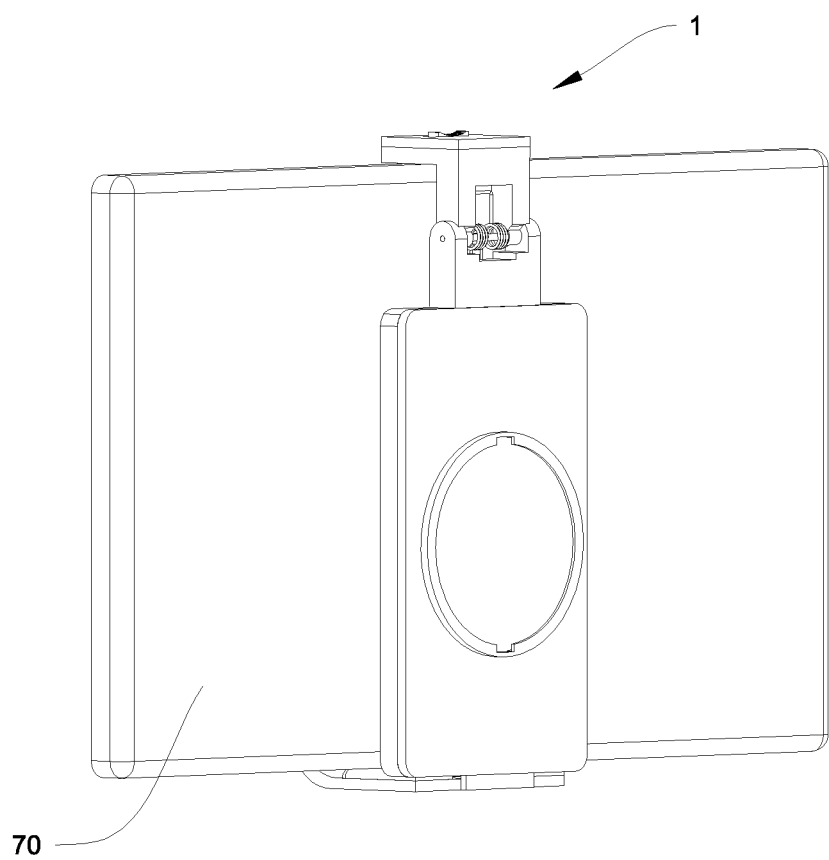
FIG. 15 is a stereoscopical schematic view of the mobile phone to be horizontally placed with the wireless charger assembled according to Example 6 of the present invention.

Please refer to FIG. 15, FIG. 15 is a stereoscopical schematic view of the mobile phone to be horizontally placed with the wireless charger assembled according to Example 6 of the present invention. The wireless charger 1 of Example 6 of the present invention is substantially the same as the above Example 1, but the details mentioned above applies to the wireless charger with the only difference that the mobile phone of Example 6 is horizontally disposed in the wireless charger 1.

Figure 16:
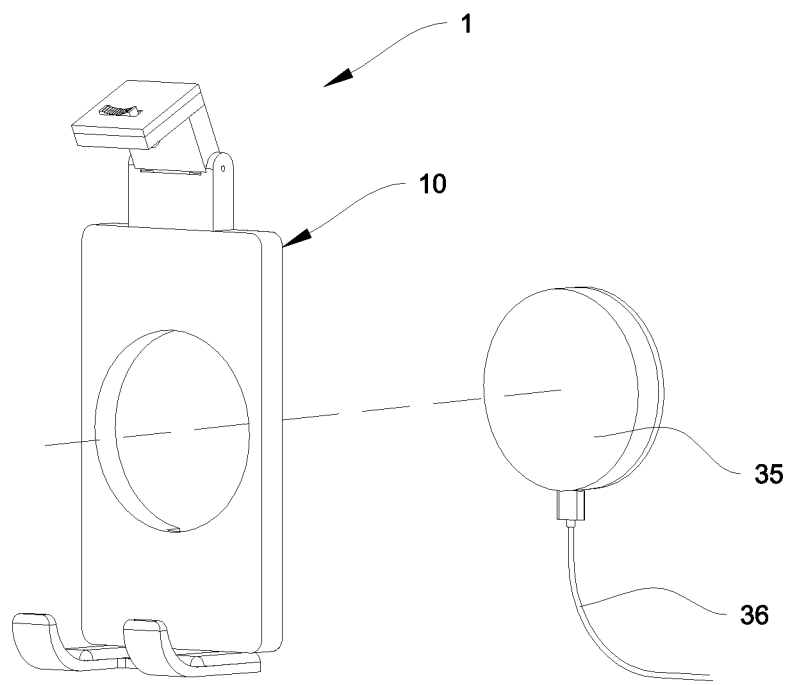
FIG. 16 is a stereoscopical schematic view of the wireless charger according to Example 7 of the present invention.

Please refer to FIG. 16, FIG. 16 is a stereoscopical schematic view of the wireless charger according to Example 7 of the present invention. The wireless charger 1 of Example 7 of the present invention is substantially the same as the above Example 1, but the details mentioned above applies to the wireless charger with the only difference that the wireless charger 1 further comprises an encapsulating shell 35 and a connecting cable 36, the encapsulating shell 35 is connected to the connecting cable 36, and the inductive coil (not shown in figure), the controlling circuit board (not shown in figure), the through hole (not shown in figure) and the plug hole (not shown in figure) are encapsulated in the encapsulating shell 35. The encapsulating shell 35 is separated from the housing 10 by the user to provide another way for charger the mobile phone. Namely, the encapsulating shell 35 is used for charging one mobile phone, and the housing and the fixing unit are used for fixing another mobile phone.

The foregoing description, for the purpose of explanation, has been described with reference to specific embodiments; however, the embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

We claim:

1. A wireless charger, comprising:
    a housing made of a front cover and a back cover, an accommodating space formed by the front cover and the back cover, and the back cover having a fastener and a block;
    a fixing unit having a fixing gear, an upper gear rack, a bottom gear rack and a fixing structure, the fixing gear fixing on the block of the back cover, a bottom of the bottom gear rack protruding a supporting member, the upper gear rack and the bottom gear rack mating with the fixing gear, the fixing gear to be rotated by a movement of the upper gear rack and the bottom gear rack, and the fixing structure fixed to the upper gear rack by a spring structure; and
    a wireless charging unit comprising an inductive coil, a controlling circuit board, a through hole and a plug hole, the inductive coil electrically connected to the controlling circuit board and disposed in the accommodating space, the fastener disposed through the through hole of the inductive coil to fix the inductive coil and the controlling circuit board, the plug hole connected to a charging device as a power of the wireless charger;

wherein the fixing structure having two rollers, an axis rod, a recess and a switcher, the axis rod disposed through the two rollers and the two rollers disposed in the recess;

wherein the two rollers respectively have two notches, and the switcher is disposed over the two rollers, when the two notches face to the switcher, the switcher is abutted on the two notches by moving the switcher to limit the rotation of the two rollers.

2. The wireless charger according to claim 1, wherein the fixing structure has an upper plate structure and a bottom plate structure opposite to the upper plate structure, the switcher is disposed through an opening on the upper plate structure to protrude the upper plate structure, and the recess is disposed on the bottom plate structure, so that the two rollers partially protrude the bottom plate structure.

3. The wireless charger according to claim 1, wherein the spring structure comprises a spring member and a pivot axis, the upper gear rack comprises a buffer portion having two first circular holes which are oppositely disposed each other and disposed through a top of the buffer portion, the fixing structure comprises an extension portion having two second circular holes which are oppositely disposed each other and disposed through a bottom of the fixing structure, and the pivot is axis disposed through the two first circular holes and the two second circular holes, so that the spring member is pivoted between the buffer portion and the extension portion.

4. The wireless charger according to claim 1, wherein the wireless charging unit further comprises an encapsulating shell and a connecting cable, the encapsulating shell is connected to the connecting cable, and the inductive coil, the controlling circuit board, the through hole and the plug hole are encapsulated in the encapsulating shell, so that the encapsulating shell is separated from the housing.

5. The wireless charger according to claim 1, wherein the appearance of each of the two rollers is a cylinder, a gear shape, a star shape, a column, a fan shape or a cylinder shape with a notch.

6. The wireless charger according to claim 1, further comprises a fixture having a first threaded hole, a first screw and a holder; wherein the first screw is engaged with the first threaded hole and a first thread of the back cover, and the fixture has an orbicular portion connected to the first threaded hole, so that the fixture is conjugated to the back cover.

7. The wireless charger according to claim 1, further comprises a connecting seat having a second threaded hole, a second screw and a fastening member; wherein the second screw is engaged with the second threaded hole and a second thread of the back cover, and the fastening member is connected to the second threaded hole.

8. A wireless charger, comprising:
a housing made of a front cover and a back cover, an accommodating space formed by the front cover and the back cover, and the back cover having a fastener and a block;
a fixing unit having a fixing gear, an upper gear rack, a bottom gear rack and a fixing structure, the fixing gear fixing on the block of the back cover, a bottom of the bottom gear rack protruding a supporting member, the upper gear rack and the bottom gear rack mating with the fixing gear, the fixing gear to be rotated by a movement of the upper gear rack and the bottom gear rack, and the fixing structure fixed to the upper gear rack by a spring structure;
a wireless charging unit comprising an inductive coil, a controlling circuit board, a through hole and a plug hole, the inductive coil electrically connected to the controlling circuit board and disposed in the accommodating space, the fastener disposed through the through hole of the inductive coil to fix the inductive coil and the controlling circuit board, the plug hole connected to a charging device as a power of the wireless charger; and
an elastomeric member disposed on a surface of the fixing structure.

9. The wireless charger according to claim 8, wherein the spring structure comprises a spring member and a pivot axis, the upper gear rack comprises a buffer portion having two first circular holes which are oppositely disposed each other and disposed through a top of the buffer portion, the fixing structure comprises an extension portion having two second circular holes which are oppositely disposed each other and disposed through a bottom of the fixing structure, and the pivot is axis disposed through the two first circular holes and the two second circular holes, so that the spring member is pivoted between the buffer portion and the extension portion.

10. The wireless charger according to claim 8, wherein the elastomeric member is an elastomeric polymer comprising a synthetic rubber and a natural rubber.

* * * * *